UNITED STATES PATENT OFFICE.

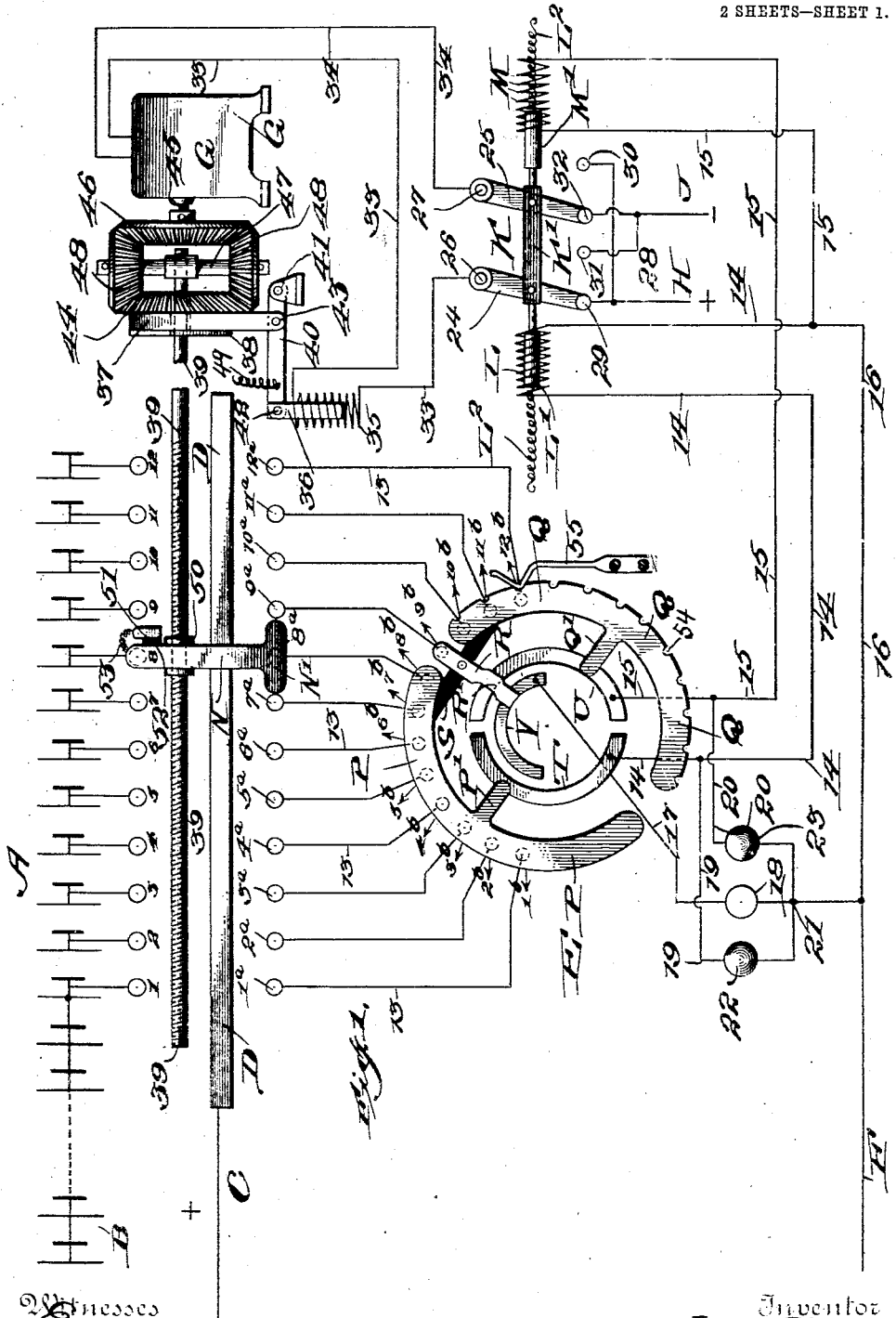

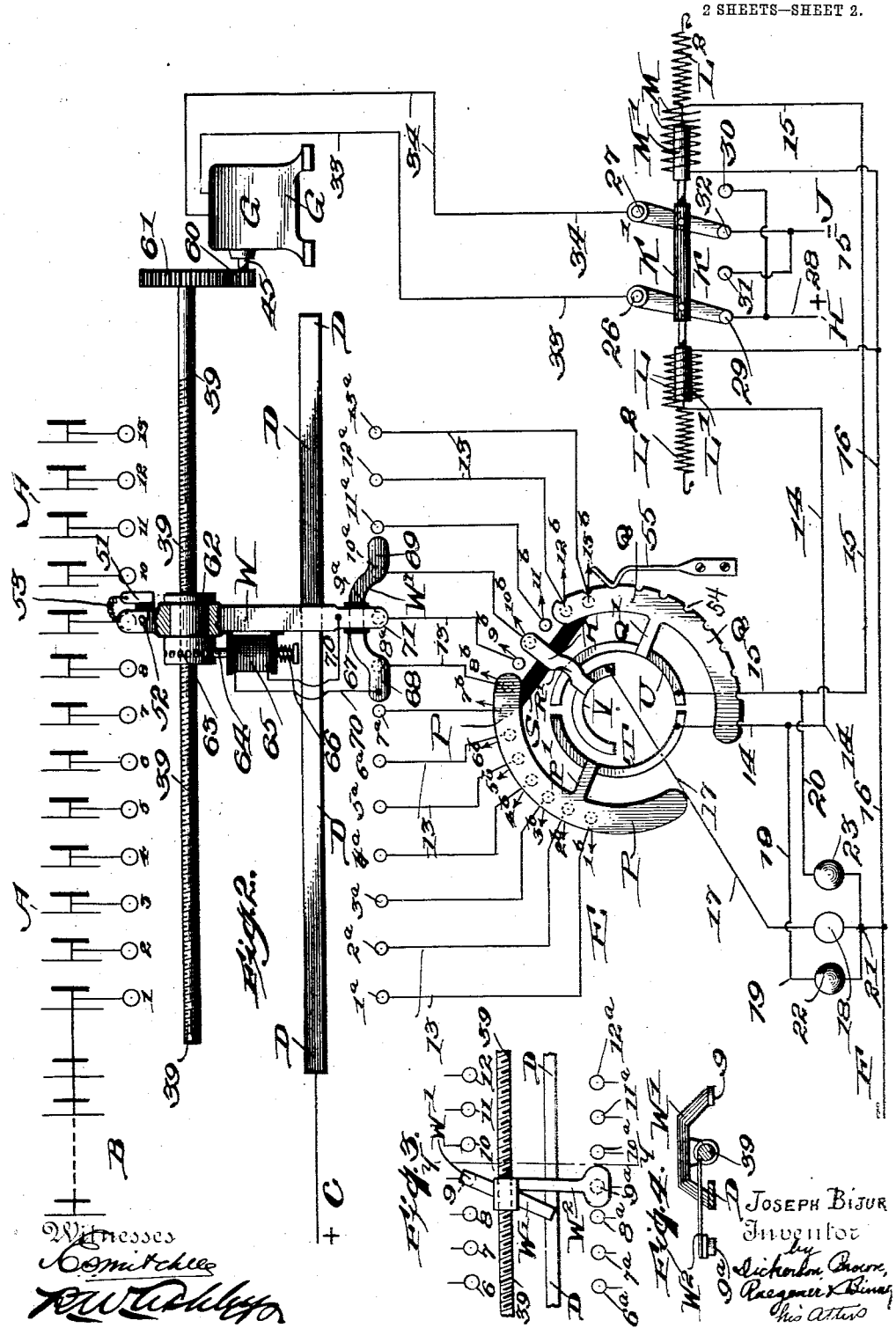

JOSEPH BIJUR, OF NEW YORK, N. Y., ASSIGNOR TO GENERAL STORAGE BATTERY COMPANY, OF NEW YORK, N. Y., A CORPORATION OF NEW YORK.

END-CELL SWITCH.

No. 810,389.　　　Specification of Letters Patent.　　　Patented Jan. 23, 1906.

Application filed October 14, 1904. Serial No. 228,405.

*To all whom it may concern:*

Be it known that I, JOSEPH BIJUR, a citizen of the United States, and a resident of the borough of Manhattan, city, county, and State of New York, have invented certain new and useful Improvements in End-Cell Switches, of which the following is a specification accompanied by drawings.

This invention relates to electric switches, more particularly to end-cell switches for storage batteries, by means of which the number of end cells of a storage battery connected to the line may be controlled.

The objects of the invention are to improve upon the construction of such switches and enable the end cells to be efficiently controlled from a distance in such manner that the number of cells desired to be used at a given time may be automatically placed in circuit and varied at will according to the needs of the system.

Another object of the invention is to afford means for indicating at the distant point of control the position and effective operation of the switching apparatus and devices.

The invention may be used in any connection in which it may be found applicable, whether in connection with end cells or other devices, and the controlling-switch apparatus need not necessarily be situated at a distance from the devices controlled, but may be used to control the cells at the place of use directly.

Further objects of the invention will hereinafter appear; and to these ends the invention consists of circuits, apparatus, and devices for carrying out the above objects and embodying the features of construction, combinations of elements, and arrangement of circuits and parts having the general mode of operation as fully described and claimed in this specification and shown in the accompanying drawings, in which—

Figures 1 and 2 are diagrammatic representations of circuits and apparatus embodying the invention in different preferred forms. Fig. 3 is a detail plan view of the preferred method of mounting the brush used. Fig. 4 is a transverse sectional view of Fig. 3 on the line *y y*.

In the figures only so much of the electric circuits is shown as applies to the end cells A of the storage battery and the means for switching more or less of them into the line between the negative side B of the battery and the positive main C, connected to the bus-bar D. In a system of distribution of this character the storage battery may be connected across the line, as in this instance, and used in connection with an auxiliary generator or booster in addition to the main generator or source of supply. The switching apparatus (represented by E) controls circuits connected in this instance in shunt across the line between the positive bus-bar D and the negative main to which the terminal wire F leads. The reversible motor G for actuating a portion of the end-cell-switching apparatus may be separately excited or energized from the positive and negative leads H and J, connected to the positive and negative mains of the system and controlled in operation and direction of rotation by the reversing-switch K, in turn controlled by the main switching apparatus or controller E, energizing the reversing-switch solenoids or magnets L and M. According to the direction of rotation of the motor G the movable switch-bar or contact N is moved in one direction or the other along the bar D and the contacts 1 to 12, inclusive, of the end cells A and automatically brought to rest upon the desired one of the said contacts, thereby including more or less of the cells A in circuit with the bar D and the line. Any suitable motor G may be used the field of which is preferably constantly excited in one direction from any suitable source, and the reversing-switch K may be of any suitable character, the switch shown being by way of illustration only. The main controller E in this instance is designed to be operated by hand by turning the outer contact-segments P and Q, together with the contact piece or tongue R, connected to move therewith, but insulated therefrom, being carried by the insulating-bar S. The central contact-segments T, U, and V are in this instance stationary, and, as shown, the contact-tongue R is curved or bowed at R', so that it does not make contact with the segments T and U, but only with segment V. Tongues P' and Q' extend from segments P and Q and make contact with segments T and U. The segment Q in this instance is provided with notches 54, with which a spring-arm 55 coöperates to hold the switch in a given position.

Obviously many different forms of controller E may be designed for carrying out the objects of this invention, and one preferred form is shown by way of illustration. As shown, there are a series of auxiliary contacts $1^a$ to $12^a$, inclusive, corresponding to the end-cell contacts 1 to 12, and another series of corresponding contacts $1^b$ to $12^b$ are arranged in the arc of a circle and connected by wires 13 of any desired length to contacts $1^a$ to $12^a$, respectively. The segments P and Q and contact-tongue R are arranged to sweep over contacts $1^b$ to $12^b$ and make contact therewith. The central segments T and U are connected by wires 14 and 15 to solenoids L and M, and thence return by a common conductor 16 to the wire F, leading to the negative main. The central segment V is connected by wire 17, through a signal-lamp 18, to wire F, and branch wires 19 and 20 connect wires 14 and 15 with wire 18 at the point 21. Lamps 22 and 23 are included in the circuit of wires 19 and 20, respectively, and these lamps 22 and 23 are preferably of different colors, lamp 22 being red, for instance, and lamp 23 white. The other lamp 18 may be white to serve the purpose hereinafter to be described. The solenoids L and M are provided with cores L' and M', connected to retracting-springs $L^2$, connected to a bar K', to which are pivoted the switch-arms 24 and 25, adapted to be mounted at 26 and 27 upon any suitable support. A positive wire 28, as shown, is connected to contacts 29 and 30, while a negative wire is connected to contacts 31 and 32, with which contacts the switch-arms 25 and 24 make contact. Arms 24 and 25 are connected by wires 33 and 34 to the terminals of motor G, and in the circuit of wire 33 is included the coil of a magnet 35, having a core 36 connected to control a band-brake 37 on the pulley 38, carried by the bevel-gear 44, loose on shaft 39, which is actuated by the motor G. Between the motor-shaft 45 and switch-shaft 39 is provided a differential gearing to enable the motor to rotate without rotating the shaft 39 and also to control the rotation of said shaft. As shown, a lever 40 is pivoted at 41 and connected to the core 36 at 42. A spring 49 is provided for lever 40, opposing the action of magnet 35. The band-brake 37 is connected to the lever 40 at 43, so that when magnet 35 is energized the core 36 is drawn down and the brake 39 is tightened to clamp the pulley 38 and bevel-gear 44, thereby causing shaft 39 to rotate at half-speed.

The motor-shaft 45 carries a bevel-gear 46, while upon the end of shaft 39 is provided an arm 47, carrying the bevel-gears 48, meshing with gears 44 and 46. When magnet 35 is deënergized, the idle gear 44 is released, and rotation of the motor does not cause rotation of shaft 39.

Upon the screw-shaft 39 is a traveling internally-screw-threaded sleeve 50, which is moved in one direction or the other along shaft 39, according to the direction of rotation of the shaft. The sleeve 50 carries the contact-arm N, preferably suitably insulated therefrom, which arm N makes contact with contacts 1 to 12, the bar D, and also with contacts $1^a$ to $12^a$. The lower end N' of arm N is broadened into a T shape in order that it may bear upon the next adjacent contact $1^a$, $2^a$, &c., as it travels before it leaves the preceding contact of the same series. Preferably the arm N carries at its upper end an auxiliary contact 51, supported upon an insulating-piece 52 and connected to arm N by a resistance 53. The relation between arm N and contact 51 is such that any adjacent pair of contacts 1 to 12 may be bridged at once, and the resistance 53 is to prevent short-circuiting of a pair of cells A as the arm N travels.

In the position of the parts shown in Fig. 1 the arm N is in the act of moving to the right, and it will come to a stop on contact 9 of the cell-contacts and No. $9^a$ of the corresponding series of switch-contacts, in which case all the cells up to No. 9 will be included in circuit between the negative side B of the storage battery and positive bus-bar D. In order to cause arm N to move to a given position, the contact-arm R is first moved to the corresponding contact on the series $1^b$ to $12^b$. As shown, arm R is resting upon contact $9^b$, and the adjacent ends of segments P and Q have been moved with arm R, so that they bear upon contacts $8^b$ and $10^b$, respectively, at each side of contact $9^b$. With the parts in the position indicated a circuit will be completed from the positive bus-bar D through arm N to contact $8^a$, from thence by wire 13 to contact $8^b$, and through segment P and projection P' to segment T, thence by wire 14 to and through solenoid L, and out by wire 16 to the negative wire F. A circuit is also completed through red lamp 22 by wires 14 and 19 to wire F. The energizing of magnet L has moved switch K into the position shown, whereby a circuit is completed through motor G and magnet 35 from the leads H and J in such direction as to cause the motor to rotate the shaft 39 and move the traveling sleeve 50 toward the right. The energizing of magnet 35 has tightened the band-brake 37, so that the differential gearing transmits the rotation of the motor-shaft 45 to the screw-shaft 39. The lighting of red lamp 22 indicates to the operator that the arm N is moving to the right, and as long as arm N keeps moving lamp 22 will burn. The T-shaped portion N' of arm N makes contact with contact $9^a$ before it leaves contact $8^a$, and an additional circuit is completed from bar D and arm N through contact $9^a$, wire 13, contact $9^b$, tongue R, to segment V, and thence by wire 17 through lamp 18 to wire F. The lighting of lamp 18 indicates to the operator that the arm N has reached the desired contacts Nos. 9 and 9ª, upon which it is to come to rest. The circuit of motor G is still unbroken at this stage; but as soon as the portion N' of arm N leaves contact 8ª and bears only upon contact 9ª the motor-circuit is broken, because the circuit described, including magnet L, is broken between arm N and contact 8ª, the switch K resumes its normal position, with arms 24 and 25 between their contacts 29, 30, 31, and 32, thereby cutting current off of the motor G and releasing the band-brake 37. It will be seen that the motor-armature may rotate for a few moments from its own momentum after the circuit thereto is broken without rotating screw-shaft 39, because the idle bevel-gear 44 is released by the brake, and the differential gear will not transmit motion to shaft 39. The deënergizing of the circuit of magnet L also deënergizes the circuit of red lamp 22, which goes out, leaving lamp 18 burning, which indicates to the operator that arm N has come to rest in the desired position. In order to cause arm N to move automatically to any given position either forward or back, it is only necessary, as stated, to adjust the controller E with the contact-tongue R resting upon the desired contact of the series 1ᵇ to 12ᵇ. If tongue R were moved upon contact 3ᵇ, for instance, the magnet M of the reversing-switch would be energized, and the red lamp 23 would be lighted. Motor G would rotate shaft 39 in a direction to move arm N toward contacts 3 and 3ª, where it would come to rest automatically, and lamp 23 would indicate that arm N was traveling to the left.

In Fig. 2 the controller E, reversing-switch K, motor G, the lamps, and arrangement of end cells A and bus-bar D with the electric circuits are substantially the same as in Fig. 1, the principal difference between the two forms of apparatus residing in the construction of the traveling arm which controls the end cells and the driving connections between the motor and the screw-shaft 39. The function of the apparatus in each figure is the same. In Fig. 2 the cells and their series of contacts are numbered from 1 to 13, inclusive, although in either form of the apparatus any desired number of cells and corresponding contacts may be used. It will be seen that the controller E is so constructed that three contacts of the series 1ᵇ to 13ᵇ are adapted to fall between the ends of the segments P and Q, and the tongue R is placed upon the desired contact—as, for instance, 10ᵇ—which leaves contacts 9ᵇ and 11ᵇ on each side without any portion of the controller E resting thereon. The segments P and Q, as shown, bear upon contacts 8ᵇ and 12ᵇ. The motor-shaft 45 carries a pinion 60, meshing with a gear 61 upon the screw-shaft 39. The traveling sleeve 62, as shown, is loose in the contact-arm W and free to rotate, and means are provided for automatically connecting said sleeve fast to arm W, so that rotation of shaft 39 will cause the sleeve to travel. As shown, the sleeve is provided with holes 63, with which a pin 64 is adapted to coöperate. This pin 64 is controlled by a magnet 65, of which the pin forms the armature. Normally the pin 64 is held out of engagement with one of the holes 63 by the retracting-spring 66. When magnet 65 is energized, the pin is moved into one of the holes 63, and since the magnet is carried by arm W the sleeve and arm will be locked together, as shown in Fig. 2. Any form of mechanism may be used which will electrically arrest the rotation of sleeve 62, such as an electric clutch, band-brake, or the like. Arm W carries a cross contact bar or arm W', insulated therefrom by insulation. Arm W' is so shaped and constructed that its ends 68 and 69 will each bear upon two contacts of a pair at once of the series 1ª to 13ª; but the distance between the outer ends of bar W' is such that as in the position shown said bar will not quite reach the full distance between five contacts, and consequently in the position shown the ends 68 and 69 each bear upon a single contact. The lower end 71 of the main contact-arm W extends sufficiently beyond the insulation 67 to bear upon contacts 1ª to 13ª as it passes over them. The magnet 65 is adapted to be included in circuit between arms W and W' by wire 70. With the parts in the position shown arm W is moving to the right and will come to rest with the lower end 71 resting upon contact 10ª, because contact-tongue R of controller E is upon the corresponding contact 10ᵇ. As shown, a circuit is completed from bar D and arm W by wire 70 through magnet 65 to cross-arm W' and thence out to negative wire F, as described in connection with Fig. 1, whereby magnet 65, lamp 22, and magnet L are all energized, the reversing-switch K is moved to the position shown, and motor G rotates. The energizing of magnet 65 moves pin 64 into one of the holes 63, and the sleeve 62 travels to the right. When the end 68 of cross-arm W' leaves contact 8ª, the circuit of magnet 65, lamp 22, and magnet L will be broken, and the motor will stop, and pin 64 will be retracted. The arm W and cross-arm W' will come to rest with the end 71 resting upon contact 10ª, while the ends 68 and 69 will rest upon contacts 9ª and 11ª, respectively.

It will be seen that according to this invention there are a set of main contacts for the end cells, a set of auxiliary contacts corresponding thereto, and a set of controller-contacts corresponding to said two first-named sets, the controller-contacts being situated at the point or place of control, which may be distant from the end cells to be controlled.

The end-cell contact-arm will automatically move to a given point, which movement is controlled from a distance, if desired, and said arm will stop at a point previously determined upon, although the actuating-motor may continue to rotate thereafter.

It will be seen that, if desired, the differential gearing and operative connections shown for the motor G in Fig. 1 may be substituted for the motor-gearing shown in Fig. 2, and the electric detent controlled by the magnet 65 shown in Fig. 2 may be, if desired, applied to the construction shown in Fig. 1. Other combinations may also be made of the mechanical and electrical features of the end-cell switches shown in the drawings.

In large sizes of end-cell switches the brushes are preferably made of leaf or strip copper in order to insure better contact against the bus-bar and switch-contacts and also to reduce the size of the brush. In the operation of such switches the sharp ends of the leaf copper will cut grooves in the contacts and bus-bars, and in the course of time these surfaces become so abraded that the contact is no longer good. In order to obviate this difficulty, I prefer to set the brushes at an angle to the line of travel which is not a right angle—that is, the brush reaches from a contact to the bus-bar in a diagonal direction, as indicated in Fig. 3. In this way the movement does not take place in a line with the edges of the brush strips, and this cutting is prevented. I am aware that other means have been suggested for obviating this difficulty, such as bending the ends of each individual strip of which the brush is made up; but such a method is somewhat difficult to carry out and makes the assembling of the individual leaves into the complete brush a troublesome and expensive matter.

In Figs. 3 and 4 it will be seen that the brush W' is constructed of a plurality of sheets or leaves of copper arranged one on top of the other and the leaves then bent to the form indicated in Fig. 4 to bridge the cell-contacts and the bus-bar D. Since very little current is taken by the controller, an arm $W^2$, having a broadened end, is provided, suitably secured to the traveling nut 50 and adapted to bear upon the controller-contacts, (indicated by $1^a$, &c.)

Obviously some features of my invention may be used without others, and the invention may be embodied in widely-varying forms.

Therefore, without limiting myself to the constructions shown and described nor enumerating equivalents, I claim, and desire to secure by Letters Patent, the following:

1. An electrical switching apparatus, comprising devices to be controlled, a main contact-arm controlling the same and adapted to move in either direction, reversible actuating means for said arm, a reversing-switch, a controller connected to control said switch, and electric circuits and connections whereby movement of the controller to a given position causes movement of the main contact-arm in the desired direction to a predetermined position.

2. An electrical switching apparatus, comprising devices to be controlled and switched into and out of circuit, series of main and auxiliary contacts, a main contact-arm connected in circuit and arranged to make contact with said contacts, means for actuating said arm in either direction, and a controller adapted to be situated at a distance from the devices to be controlled and connected to control said actuating means, with circuits and connections so arranged that the direction of movement and position of the main contact-arm may be determined from a distance.

3. The combination with the end cells of a storage battery, of a main contact-arm for controlling the number of cells in circuit, means for actuating said arm in either direction, a controller adapted to be situated at a distance and connected to control the said actuating means, with circuits and connections so arranged that the main contact-arm is automatically moved and brought to rest by moving the controller into a given position.

4. An electrical switching apparatus, comprising devices to be controlled, provided with a series of main contacts, an auxiliary series of contacts corresponding thereto, a main contact-arm connected in circuit and adapted to be moved over said main and auxiliary contacts, a controller having a series of controller-contacts corresponding to the main and auxiliary contacts and connected to the auxiliary contacts, means for actuating said main contact-arm backward and forward, and operative means for controlling said actuating means from the controller, whereby movement of the controller to a given position causes the movement of the main contact-arm in the desired direction to a predetermined position.

5. The combination with the end cells of a storage battery, of a switch for controlling the number of cells in circuit, means for actuating said switch automatically from a distance, and means for indicating to the operator by the position of the controller the direction and extent of movement of the switch.

6. The combination with the end cells of a storage battery, of a switch for controlling the number of cells in circuit, reversible driving means for actuating said switch automatically from a distance, and means for permitting said actuating means to operate in either direction after the said switch has reached its predetermined position and come to rest.

7. The combination with the end cells of a storage battery, of a switch for controlling the number of cells in circuit, a hand-controller, and circuits an apparatus controlled thereby for automatically moving said switch to any position in its entire range of travel by moving the hand-controller to a corresponding position, and means for preventing said switch from stopping before reaching its desired position.

8. The combination with the end cells of a storage battery, of a switch for the same, means for actuating said switch having rotating members, electrical means for interfering with the rotation of one of said members and thereby actuating the switch, and means for automatically releasing the said member when the switch reaches its desired predetermined position.

9. The combination with the end cells of a storage battery, of a switch for the same, means for actuating said switch having rotating members, an electromagnet operatively arranged to interfere with the rotation of one of said members and thereby actuate the switch, and circuits and apparatus for automatically moving said switch to a given position.

10. In an end-cell switch, the combination with the contact, of a brush coöperating therewith both the body portion and contact edges being arranged diagonally to the line of travel, to distribute wear on the contact.

11. In an end-cell switch, the combination with the contact, of a brush coöperating therewith, comprising a plurality of metallic sheets or leaves, both the body portion and contact edges being arranged diagonally to the line of travel, whereby wear on the contact is distributed.

In testimony whereof I have signed this specification in the presence of two subscribing witnesses.

JOSEPH BIJUR.

Witnesses:
E. VAN ZANDT,
HERBERT G. OGDEN, Jr.